(12) United States Patent
Jayasena et al.

(10) Patent No.: US 10,585,826 B2
(45) Date of Patent: Mar. 10, 2020

(54) USING PROCESSOR TYPES FOR PROCESSING INTERRUPTS IN A COMPUTING DEVICE

(71) Applicant: Advanced Micro Devices, Inc., Sunnyvale, CA (US)

(72) Inventors: Nuwan S. Jayasena, Sunnyvale, CA (US); Andrew G. Kegel, Redmond, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 440 days.

(21) Appl. No.: 15/005,378

(22) Filed: Jan. 25, 2016

(65) Prior Publication Data
US 2017/0212851 A1    Jul. 27, 2017

(51) Int. Cl.
*G06F 13/24*        (2006.01)
(52) U.S. Cl.
CPC .................... *G06F 13/24* (2013.01)
(58) Field of Classification Search
CPC .. G06F 13/24; G06F 12/1081; G06F 12/1027; G06F 13/32
See application file for complete search history.

(56) References Cited

U.S. PATENT DOCUMENTS

| | | | | |
|---|---|---|---|---|
| 9,501,227 B2* | 11/2016 | Pigott | .................... | G06F 3/0611 |
| 2004/0267998 A1* | 12/2004 | Zimmer | .................. | G06F 13/24 710/261 |
| 2005/0015764 A1* | 1/2005 | Gaur | ..................... | G06F 9/4812 718/100 |
| 2007/0124523 A1* | 5/2007 | Shimizu | .................. | G06F 13/24 710/260 |
| 2008/0114916 A1* | 5/2008 | Hummel | ............. | G06F 12/1081 710/266 |
| 2011/0087814 A1* | 4/2011 | Liu | ......................... | G06F 13/24 710/260 |
| 2011/0161541 A1* | 6/2011 | Madukkarumukumana | | ................ G06F 9/4812 710/260 |
| 2012/0144172 A1* | 6/2012 | de Cesare | ............... | G06F 13/24 712/244 |
| 2014/0108691 A1* | 4/2014 | Kennedy | ............... | G06F 9/5027 710/269 |
| 2014/0173152 A1* | 6/2014 | Kegel | ..................... | G06F 13/24 710/269 |
| 2014/0229648 A1* | 8/2014 | Tsirkin | ..................... | G06F 13/24 710/269 |

(Continued)

*Primary Examiner* — Henry Tsai
*Assistant Examiner* — Christopher A Daley
(74) *Attorney, Agent, or Firm* — Park, Vaughan, Fleming & Dowler LLP (57) ABSTRACT

The described embodiments include a computing device with multiple interrupt processors for processing interrupts. In the described embodiments, each of the multiple processors is classified as one or more processor types based on factors such as features and functionality of the processor, an operating environment of the processor, the characteristics of some or all of the available interrupts, etc. During operation, an interrupt controller in the computing device receives an indication of an interrupt. The interrupt controller then determines a processor type for processing the interrupt. Next, the interrupt controller causes the interrupt to be processed by one of the plurality of processors that is the determined processor type.

20 Claims, 6 Drawing Sheets

(56) References Cited

U.S. PATENT DOCUMENTS

| | | | |
|---|---|---|---|
| 2014/0351471 A1* | 11/2014 | Jebson | G06F 13/24 |
| | | | 710/269 |
| 2014/0372649 A1* | 12/2014 | Raffman | G06F 9/5083 |
| | | | 710/260 |
| 2015/0127866 A1* | 5/2015 | Zeng | G06F 13/26 |
| | | | 710/264 |
| 2015/0172305 A1* | 6/2015 | Dixon | G06F 21/53 |
| | | | 726/23 |
| 2015/0277763 A1* | 10/2015 | Zhou | G06F 9/45558 |
| | | | 711/105 |
| 2015/0286595 A1* | 10/2015 | McMenamin | G06F 13/26 |
| | | | 710/264 |
| 2016/0055106 A1* | 2/2016 | Ansari | G06F 9/4812 |
| | | | 710/266 |
| 2016/0328339 A1* | 11/2016 | Ozguner | G06F 13/1668 |
| 2016/0342543 A1* | 11/2016 | Bonzini | G06F 9/4812 |
| 2017/0161096 A1* | 6/2017 | Loh | G06F 13/24 |

* cited by examiner

FIG. 1

| CATEGORY | BASIS |
|---|---|
| INTERRUPT PROCESSOR CAPABILITIES | COMPUTATIONAL POWER (CLOCK FREQUENCY, OPERATIONS PER SECOND (OPS), PIPELINES, CACHE SIZES, ETC.), ARCHITECTURAL SPECIFICATIONS (INSTRUCTION SET ARCHITECTURE (ISA)), MEMORY ACCESS SPEED, BUS TYPES, ETC. |
| INTERRUPT TYPES AND PROPERTIES | TYPE OF PROCESSING REQUIRED, TYPE AND LOCATION OF RESOURCES ACCESSED, ETC. |
| OBJECT OR RESOURCE LOCALITY OR AFFINITY FOR INTERRUPT PROCESSORS | LOCALITY OR AFFINITY OF OBJECTS IN A GIVEN MEMORY, ACCESS TO COMPUTATIONAL RESOURCES, ETC. |
| INTERRUPT PROCESSOR VIRTUALIZATION OR PARTITIONING | GROUPING OF INTERRUPT PROCESSOR INTO VIRTUAL GROUPS OR SEPARATE GROUPS FOR RUNNING PARTICULAR SOFTWARE, ETC. |
| INTERRUPT PROCESSOR WORKLOAD | MONITORED AND/OR HISTORICAL INTERRUPT PROCESSOR WORKLOAD, ETC. |
| INTERRUPT PROCESSOR SECURITY AND DATA ACCESS | SECURITY ATTRIBUTES FOR DATA, SYSTEM RESOURCES (REGIONS OF CACHES, MEMORY, FUNCTIONAL BLOCKS, ETC.), NETWORK RESOURCES, ETC. ACCESSIBLE TO INTERRUPT PROCESSOR. ETC. |

USING PROCESSOR TYPES FOR PROCESSING INTERRUPTS IN A COMPUTING DEVICE

BACKGROUND

Field

The described embodiments relate to processing interrupts. More specifically, the described embodiments relate to processing interrupts using heterogeneous processor types in a computing device.

Related Art

Many modern computing devices include processors (central processing units (CPUs), graphics processing units (GPUs), etc.) that provide support for handling interrupts. Generally, interrupts are signals that are emitted by hardware or software entities that indicate to processors that corresponding events are to be processed by the processors. For example, a peripheral device that encounters as an input-output (I/O) event that is to be processed by a processor can signal a corresponding interrupt by emitting a signal to the processor indicating that the I/O event has occurred. Upon receiving the interrupt signal, the processor typically pauses processing operations for other program code and immediately processes the I/O event. Because processing interrupts disrupts the operation of processors (e.g., disrupts the processing of the other program code), efficient processing of interrupts is important in computing devices.

In an attempt to improve the operation of computing devices, designers have proposed a number of techniques for processing interrupts as alternatives to simply processing interrupts in receiving processors as described above. For example, in some computing devices with multiple processors, a software interrupt stack in a receiving processor may forward interrupts to another processor based on load levels of the processors. In such computing devices, however, significant overhead and delay is added to the processing of interrupts due to the handling of interrupts by software, and the software stack must be provided for the computing devices.

As another example, in some computing devices with multiple processors, I/O interrupt controllers (which route interrupts received from peripherals) determine a processor to which interrupts are routed based on a straightforward load-balancing algorithm (e.g., round-robin) and/or the load and priority of tasks on each processor. In these computing devices, however, the I/O interrupt controller may route interrupts to processors that can process the interrupt, but that are less than optimal for processing such interrupts (i.e., are optimized for other types of processing, are more remote from memory to be accessed in processing the interrupt, etc.).

As yet another example, in some computing devices with multiple processors, an interrupt controller can be configured to route particular interrupts to specific individual processors. This technique, however, is limited to manually directing each particular interrupt to a specific individual processor.

As yet another example, some computing devices with multiple processors also include a purpose-specific auxiliary processor that is specifically designed for processing interrupts. Although offloading processing of interrupts from other processors to the auxiliary processor in such computing devices, these computing devices lack the ability to optimally route interrupts to any of the available processors based on interrupt types and/or processor types, and require the additional auxiliary processor.

As yet another example, in some computing devices with multiple processors, an embedded/specialized processor includes custom logic for handling some types of interrupts. In these computing devices, such features are hard-coded in the embedded/specialized processor, and do not provide flexibility in mapping/remapping of different types of interrupts to different processors and require the addition of the embedded/specialized processor.

As yet another example, some computing devices with multiple processors can remap individual interrupts received from peripheral devices to particular processors. In existing computing devices, however, such remapping is relatively static and limited in scope in terms of interrupts that may be remapped and/or processors to which the interrupts may be remapped, and must be synchronized with mutually asynchronous activities on the peripherals and the processors.

As yet another example, some computing devices with multiple processors include a hardware interrupt queuing mechanism from which enqueued interrupts may be redirected to processors by corresponding software. This technique, however, requires that interrupts be enqueued (i.e., requires the addition of queuing mechanism) and requires software intervention and processing for redirecting the enqueued interrupts.

The above-described techniques can improve certain aspects of processing interrupts in computing devices, but the techniques are associated with interrupt processing overhead, design complexity, inflexibility, significant additional hardware, and/or other negative aspects. Improving the overall efficiency of operation of computing devices while processing interrupts without unduly increasing the complexity or cost of the computing devices remains a challenge.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the scope of the described embodiments. Thus, the described embodiments are not limited to the embodiments shown, but are to be accorded the widest scope consistent with the principles and features disclosed herein.

Overview

The described embodiments include a computing device that processes interrupts. Generally, interrupts are signals that are emitted by hardware or software entities (i.e., "interrupt sources") that indicate, to processors in the computing device (e.g., central processing units (CPUs), in-memory processors, network processors, etc.), that events are to be processed by the processors. For example, a network peripheral in the computing device may receive data over a network connection and then emit an interrupt to cause a corresponding processor to process the received data. In some embodiments, the interrupts include "in-band" interrupts, which are interrupts that may be signaled to processors by writing memory-mapped locations, and "out-of-band" interrupts, which are interrupts that may be signaled to processors using dedicated signal lines.

In some embodiments, the computing device includes one or more processors capable of processing interrupts, and each processor is classified as at least one of two or more processor "types." In these embodiments, some or all of the available interrupts in the computing device are associated with corresponding processor types for processing. For example, a network processor that is appropriate for processing data received over a network due to having processing circuits optimized for processing data received over a network, proximity to network buffers, etc. may be the processor type used for processing network-related interrupts. In these embodiments, any number of processors of each processor type may be available in the computing device, and the computing device may select any one of the processors of a corresponding processor type for processing a particular interrupt.

In some embodiments, when processing out-of-band interrupts, upon receiving an interrupt emitted by an interrupt source, an interrupt controller (or another entity such as a processor, etc.) determines the processor type for processing the interrupt. For example, the interrupt controller may determine that a peripheral device has signaled an interrupt via one or more corresponding interrupt signal lines. The interrupt controller may then check a table of interrupt-processor type associations to determine the processor type for processing the interrupt. The interrupt controller may next cause a processor of the determined processor type to process the interrupt.

In some embodiments, for processing in-band interrupts, an interrupt source first requests, from an interrupt controller in the computing device (or another source, such as an operating system, a processor, etc.) an interrupt identifier for a specified interrupt. Generally, the interrupt identifier includes information such as a memory address that the interrupt source subsequently uses for causing a corresponding processor to process the interrupt. For example, in some embodiments, the interrupt identifier is an interrupt vector. Upon receiving a request for an interrupt identifier, the interrupt controller (or other source) may check a table that includes a listing of interrupt-processor type associations to determine the processor type for processing the specified interrupt. The interrupt controller may then return a corresponding interrupt identifier to the interrupt source. Upon subsequently encountering an interrupt event, the interrupt source may use the information from the interrupt identifier to cause the corresponding processor to process the interrupt. For example, the interrupt source may write to the memory address, the write operation causing the corresponding processor to process the interrupt.

In some embodiments, the processor types that are used for processing interrupts can be updated or changed dynamically. For example, in embodiments that use tables of interrupt-processor type associations to determine processor types for processing interrupts, the tables can be wholly or partially updated or changed (replaced, overwritten, etc.) to update corresponding interrupt-processor type associations.

By using processor types as described, the described embodiments can, when processing interrupts, select from among a group of processors of similar features and functionality with regard to processing the interrupts (i.e., having similar computational capabilities, access to computational resources, workloads, etc.). This can help to improve the efficiency of processing interrupts. In addition, by dynamically updating processor types for processing interrupts, the described embodiments enable more flexible interrupt-processor type associations. These operations improve the overall efficiency of operation of the computing device without unduly increasing the complexity, cost, etc. of the computing device.

Interrupts

As described above, interrupts are signals that are emitted by hardware or software that indicate, to processors in a computing device, that corresponding events are to be processed. Generally, an "interrupt source" emits the interrupt signals to a "receiving processor." An interrupt source can be any hardware or software entity that is capable of emitting interrupt signals. For example, an interrupt source may be a processor (e.g., a central processing unit (CPU), a graphics processing unit (GPU), an accelerated processing unit (APU), an embedded or low-power processor, a network processor, an in-memory processor, etc.), a peripheral (e.g., an interface card, an input/output (I/O) device, a sensor, etc.), a memory system or cache, a controller (disk controller, I/O device controller, etc.), an application program or software routine, a driver, an operating system subroutine, and/or other hardware or software entities. A receiving processor is a hardware entity that is capable of receiving and processing interrupts. For example, the receiving processor can be a CPU, a GPU, an APU, an embedded and/or low-power processor, a network processor, an in-memory processor, etc.

In some embodiments, support is provided for one or both of "in-band" interrupts and "out-of-band" interrupts. A distinction between in-band and out-of-band interrupts is the use of two different techniques for signaling the occurrence of interrupt events to receiving processors. In some embodiments, in-band interrupts are signaled using a memory system (i.e., system buses, etc.) or other system-wide/generic signaling techniques. For example, in some embodiments, in-band interrupts are signaled by using a system memory bus (and controllers in the corresponding memory system, etc.) to write to a particular memory-mapped memory location that is monitored by a receiving processor. Out-of-band interrupts, in contrast, are signaled using dedicated signal lines such as specified pins, inputs, etc. for a receiving processor. In these embodiments, an interrupt source may assert/deassert (i.e., set to a predefined voltage level), cause a transition in, etc. a signal on one or more dedicated signal lines to indicate that a corresponding interrupt event has occurred.

In some embodiments, any of numerous different events may cause an interrupt source to signal an interrupt. For example, the events may include system timer events, keyboard controller events, chipset events, video or audio card events, Ethernet controller events, application program events, driver events, and/or many other types of events. Because interrupt controllers may include a large number (e.g., 32, 16, or another number) of physical lines for signaling out-of-band interrupts and available types of in-band interrupts may number in the hundreds, if not thousands, the number of events for which interrupts may be signaled is large.

In some embodiments, upon receiving an indication of an interrupt, a receiving processor pauses other processing or activities and executes a corresponding interrupt handler. For example, in some embodiments, a receiving processor receives an interrupt on a dedicated interrupt signal line and, based on the particular signal line, retrieves and executes corresponding program code for an interrupt handler. As another example, in some embodiments, a receiving processor determines that a memory-mapped location has been written, reads the memory mapped location to determine which interrupt handler is to be executed, and then retrieves and executes corresponding program code for the interrupt handler. Assuming that normal operation can be resumed after the interrupt handler is executed, the receiving processor may return to normal operation upon completing executing the interrupt handler (e.g., resume the paused other processing or activities). When processing interrupts, the receiving processor may also perform other operations, such as saving system state before processing the interrupt, etc.

As used in this description, the term "interrupt processor" indicates a processor that is capable of receiving and processing interrupts and/or has received and may process an interrupt. In addition, the term "receiving processor" indicates a processor that has received and may process an interrupt. Also, the term "indication of an interrupt" is used to describe a signal that is sent/received to indicate that an interrupt event has occurred. Thus, and using the examples above, when an interrupt source writes to a memory-mapped memory location or asserts a corresponding signal on a dedicated signal line, the interrupt source sends, and a corresponding receiving processor receives, an indication of an interrupt.

Computing Device

Figure 1:
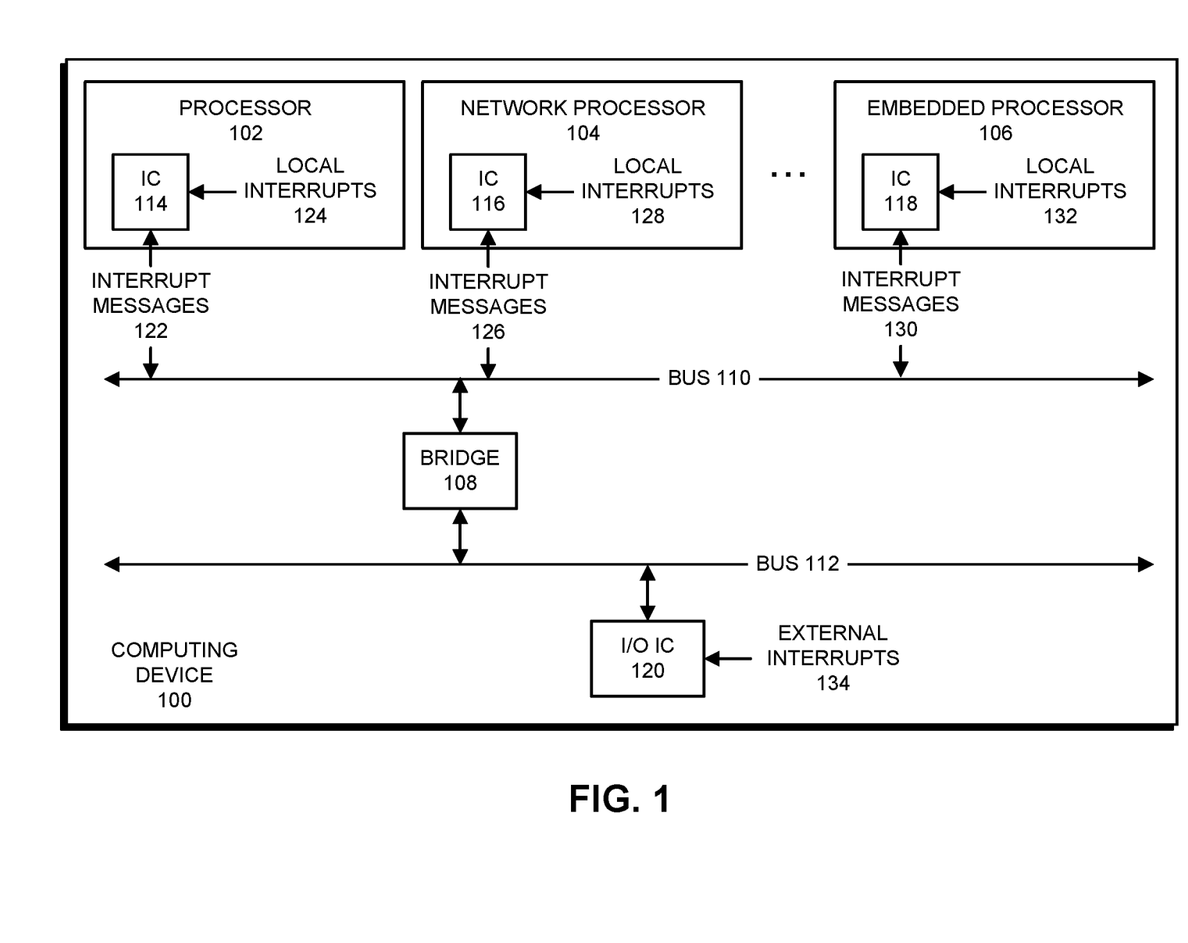
FIG. 1 presents a block diagram illustrating a computing device in accordance with some embodiments.

FIG. 1 presents a block diagram illustrating a computing device 100 in accordance with some embodiments. Generally, computing device 100 performs operations for executing program code, communicating on a network, etc. as described herein. In addition, computing device 100 processes interrupts. In some embodiments, each of a set of interrupt processors in computing device 100 is classified as at least one of two or more processor types. In these embodiments, some or all of the available interrupts in computing device 100 are associated with corresponding processor types for processing.

As can be seen in FIG. 1, computing device 100 includes processor 102, network processor 104, and embedded processor 106 (collectively "the processors"). Each of the processors is a functional block that performs computational or other types of operations. For example, in some embodiments, processor 102 includes one or more of a CPU, a GPU, and an APU that performs general-purpose computational operations (e.g., executing program code, etc.), network processor 104 includes circuits such as a baseband processor, etc. for connecting to and communicating on one or more types of network (Ethernet, Wi-Fi, cellular, Bluetooth, etc.), and embedded processor 106 is a general-purpose low-power processor that performs general purpose computational operations (e.g., executing program code, etc.). Due to having different functionality and features, the processors are considered "heterogeneous"—in contrast to "homogeneous" processors, which have similar functionality and features.

In the described embodiments, some or all of the processors are interrupt processors and are classified as at least one of two or more processor types. The classification of the processors into processor types and the processing of interrupts using processor types is described in more detail below.

Computing device 100 includes bridge 108, which is located between bus 110 and bus 112. Bridge 108 is a functional block that serves as an adapter between buses 110 and 112. Bus 110 and bus 112 are communication buses that include a number of signal lines (wires, optical connections, etc.) for communicating data, commands, etc. in computing device 100. For example, in some embodiments, bus 110 is a HyperTransport™ bus by the HyperTransport Consortium of Sunnyvale, Calif., a QuickPath Interconnect (QPI) bus, and/or another frontside bus, and bus 112 is a Peripheral Component Interconnect Express™ (PCIe) bus by PCI-SIG of Beaverton, Oreg., an Accelerated Graphics Port (AGP) bus, and/or another expansion bus.

In some embodiments, buses 110 and/or 112 include signal lines (i.e., links, wires, traces, guides, routes, etc.) for communicating out-of-band interrupts. In these embodiments, the signal lines may be dedicated, i.e., may be reserved for communicating indications of out-of-band interrupts. In some embodiments, what is shown as a single bus 110 and/or 112 may actually include a number of individual signal lines, some of which are used as a single bus for a given protocol (PCIe, AGP, HyperTransport™, etc.), whereas others are separate signal lines—and are simply grouped with buses 110 and 112 for illustrative convenience. Generally, the described embodiments include sufficient signal lines for communicating in-band and out-of-band interrupts between interrupt sources and interrupt processors as described herein.

Computing device 100 includes a number of interrupt controllers (ICs): interrupt controller 114, interrupt controller 116, interrupt controller 118, and input-output (I/O) interrupt controller 120 (collectively, "the interrupt controllers"). The interrupt controllers are functional blocks that each process interrupts for a corresponding processor or peripheral devices. For example, interrupt controller 114 processes interrupt messages 122 and local interrupts 124, I/O interrupt controller 120 processes external interrupts 134 from one or more peripheral devices, etc.

Interrupt messages 122, 126, and 130 represent interrupt signals for the respective processor 102, 104, and 106, showing that, in some embodiments, interrupt signals are communicated via bus 110 to the respective processor. For example, for an out-of-band interrupt, interrupt message 122 includes a signal asserted on one or more (possibly dedicated) signal lines of bus 110 that communicate interrupts to processor 102/interrupt controller 114. As another example, for an in-band interrupt, interrupt message 122 includes signal line(s) via which data is written to a predetermined memory location (e.g., register, memory element, etc.) to communicate an interrupt to processor 102/interrupt controller 114.

Local interrupts 124, 128, and 132 represent local interrupt signals for the respective processor 102, 104, and 106. Local interrupts 124, 128, and 132 illustrate that interrupt signals may be communicated internally from each processor (e.g., from a functional block in each processor, from an operating system or driver, etc.) to a respective interrupt controller. For example, processor 102 (e.g., a memory management unit in processor 102) can send a local interrupt 124 to interrupt controller 114 when a page fault occurs, etc.

Computing device 100 is simplified for illustrative purposes. In some embodiments, computing device 100 includes additional functional blocks or other elements for performing the operations herein described and/or other operations. For example, computing device 100 may include memories and/or caches, power controllers, batteries, media processors, communication mechanisms (e.g., a northbridge, a southbridge, etc.), networking mechanisms, display mechanisms, input/output devices, peripheral devices, etc. In addition, although a particular arrangement of processors and functional blocks is shown in computing device 100 in FIG. 1, in some embodiments, computing device 100 has a different number or arrangement of processors and/or functional blocks. For example, as shown by the ellipsis in FIG. 1, in some embodiments, one or more additional processors (an in-memory processor, etc.) may be present in computing device 100.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, network appliances, toys, automobiles, audio-visual equipment, home appliances, controllers, etc., and/or combinations thereof.

Classification of Interrupt Processors

In the described embodiments, interrupt processors are classified as processor types. As used herein, "classification" means logically grouping interrupt processors into groups of processors that have similar characteristics that enable the processors in a given group of processors to process corresponding interrupts more efficiently than other processor types. "More efficiently" means, when compared to processing corresponding interrupts using processors of other types, processors of a given type apply less computational effort, make better use of computational resources, use less electrical power, generate less heat, process corresponding interrupts with less monetary cost, process corresponding interrupts more securely and/or using private/secure data, process corresponding interrupts without assistance from other processors, process interrupts natively (e.g., without translation, interpretation, etc.), and/or otherwise better process the corresponding interrupts.

For example, a processor of a given type may use computational circuits and/or other functional blocks (memories, caches, network interface circuits, signal processors, etc.) that are better at processing corresponding interrupts, including possibly using dedicated or purpose-specific computational circuits and/or other functional blocks.

As another example, a processor of a given type may process corresponding interrupts using less compute cycles, bus transactions, memory and/or cache accesses, remote data accesses (e.g., as accessing data between nodes in a non-uniform memory access (NUMA) system, etc.), etc.

As yet another example, a processor of a given type may be part of a group that processes corresponding interrupts without exposing secure data to malicious parties, uses software having a particular license or scope, uses secure data that is not available to other processor types, etc.

Figure 2:
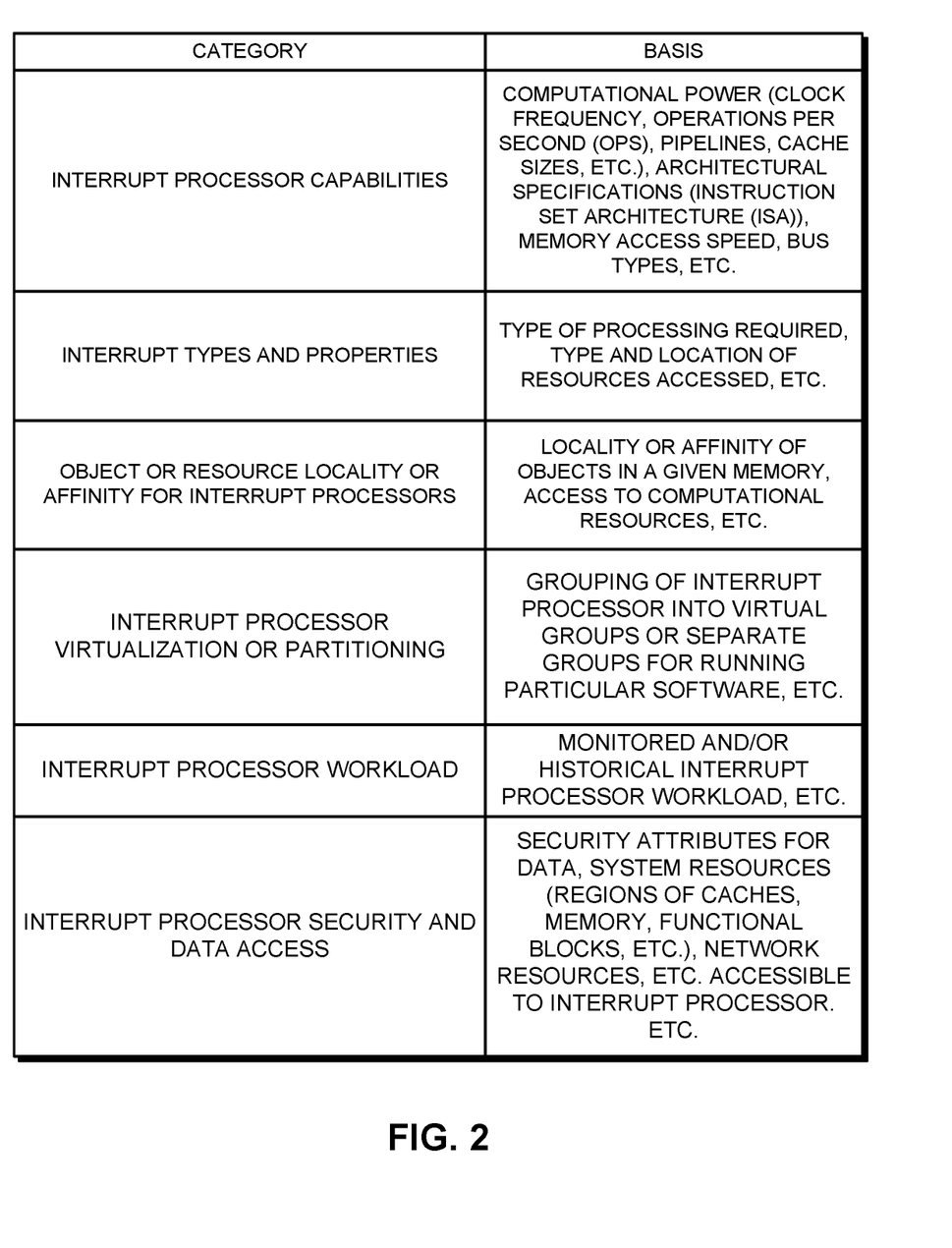
FIG. 2 presents a table of classification categories for classifying interrupt processors in accordance with some embodiments.

FIG. 2 presents a table of classification categories for classifying interrupt processors in accordance with some embodiments. In some embodiments, one or more of the classification categories are used for logically grouping interrupt processors in relation to other interrupt processors and/or in relation to corresponding interrupts. The categories listed in FIG. 2 are presented in no particular order and are simply examples, i.e., more and/or different classifications may be used in some embodiments. In addition, the example bases are intended to provide a simplified and general indication of category basis. In some embodiments, more or different bases may be used.

As can be seen in FIG. 2, there are a number of categories that may be used in classifying processors into processor types. Generally, the categories apply to/account for processors, processor environments, processor software, and interrupt characteristics. For example, processor capabilities is a category that is based on the functionality and features of each processor so that processors may be grouped into types having at least some similar functionality and features. As another example, object or resource locality or affinity for processors is a category based on a given processor's access to data objects and computational resources used for processing interrupts, such as when an in-memory processor is physically located in a memory or close to a memory in which data objects for processing interrupts are stored. As yet another example, the virtualization or partitioning of interrupt processors is based on a logical separation of processors in a multi-processor system into one or more partitions, the assignment of virtual processors for performing certain operations, etc. by an operating system/hypervisor, system administrator, user, and/or another entity.

In some embodiments, processor types may be classified, for less-known or unknown interrupts and/or interrupts with similar processing features (data structures accessed, etc.) based on other interrupts having at least some similar features. In some embodiments, one or more interrupt processors are added to a catch-all or default category, which can be designated based on the various categories above (e.g., interrupt type, etc.), or can simply be where unclassified and/or unclassifiable interrupt processors are grouped.

In some embodiments, the classification of processor types is performed by classification entity (e.g., a developer, a system administrator, a user, a controller, a processor, an operating system, an application program, etc.) based on test results, interrupt processing information, runtime statistics, system configuration information, etc. In these embodiments, a table of processor types that includes a listing of interrupt-processor type associations may be generated by the classification entity and provided to an interrupt processor (in firmware, hard-coded, etc.) for subsequent use thereby.

In some embodiments, the above-described table with the classification of processor types may be generated or updated at runtime (e.g., as computing device 100 is operating following a boot-up sequence). In these embodiments, the information used to classify processor types may be based on available interrupt processors, interrupts in use in the computing device, workloads in use on the computing device, etc. In these embodiments, a system's (e.g., computing device 100's) particular configuration may be taken into account by the developer, system administrator, user, system controller, processor, operating system, application program, etc. when generating the table.

Figure 3:
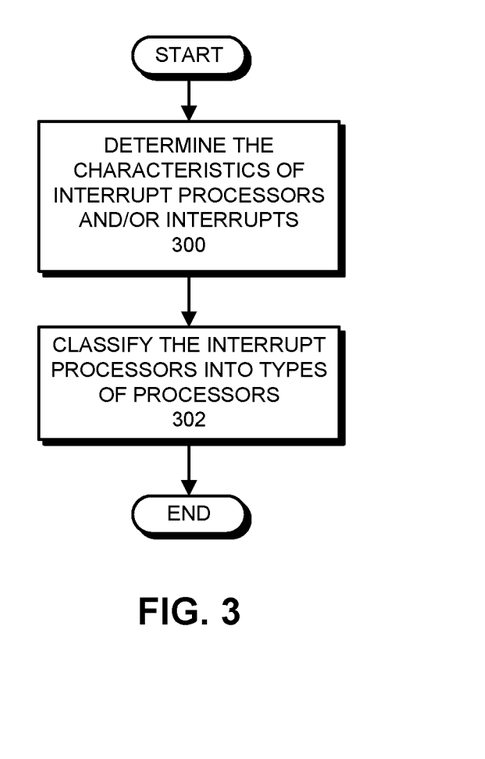
FIG. 3 presents a flowchart illustrating a process for classifying processors in accordance with some embodiments.

FIG. 3 presents a flowchart illustrating a process for classifying processors in accordance with some embodiments. Note that the operations shown in FIG. 3 are presented as a general example of operations performed by some embodiments. The operations performed by other embodiments include different operations and/or operations that are performed in a different order. Additionally, although certain mechanisms/elements are used in describing the operations, in some embodiments, other mechanisms perform the operations and/or the operations are performed on other mechanisms/elements.

As shown in FIG. 3, the process starts by determining the characteristics of interrupt processors and/or interrupts (step 300). For example, and as shown in the table in FIG. 2, the capabilities, locality or affinity of objects, virtualization and/or partitioning, and/or security are some exemplary characteristics of interrupt processors. These characteristics of the interrupt processors can be acquired based on specifications of the interrupt processors, operating environments of the interrupt processors and/or software executing thereon, software and access permissions available to the interrupt processors, etc.

As another example, the types and properties of interrupts can be acquired for some or all available interrupts. For example, a known set of interrupts can be analyzed to determine how the interrupts are processed, including determining the type and location of resources used for processing the interrupts (memory, caches, computational mechanisms, network access, etc.).

As an example, processing a given interrupt may require a large number of accesses (reads, writes, modifications, etc.) of data in a memory. In this case, the location of the resources may include the memory. More generally, for this operation, data and information are collected about the interrupt processors and/or the interrupts to enable the grouping of interrupt processors into processor types.

The interrupt processors are then classified into types of processors (step 302). As described above, this operation involves determining processors that have common characteristics with regard to interrupt processing and/or which, if any, interrupt processor processes each interrupt or type of interrupts more efficiently than other interrupt processors. For example, network processor 104, which may have processing hardware that is particularly suited for processing network-related interrupts and/or include or be closely located to resources such as network data buffers, network interfaces, etc. for processing network-related interrupts, may be classified as a corresponding processor type or added to an existing processor type. In contrast, embedded processor 106 may be less suited for processing network-related interrupts and may therefore not be classified as the corresponding processor type.

As another example, for a low-priority external interrupt that requires only a small computational effort to process, embedded processor 106 may be adequate for processing the low-priority external interrupt, and may therefore be classified as a corresponding processor type or added to an existing processor type. On the other hand, it may be wasteful (in terms of electrical power, delays in processing other program code, etc.) to use processor 102, which may be a full-power, full-feature processor, to process the low-priority external interrupt, and processor 102 may therefore not be included in the processor type.

In some embodiments, different processors that are classified as a given processor type may have significantly different overall features and/or functionality, but may be similarly suited for processing corresponding interrupts due to, e.g., access to a resource, security permissions, processing circuits, etc. In other words, heterogeneous processors may be classified together as particular processor types based on suitability for processing corresponding interrupts.

The outcome of step 302 is an identification of type(s) of processors that each include a subset or portion of the interrupt processors and an identification of which processor types are to be used to process some or all of the interrupts.

Figure 4:
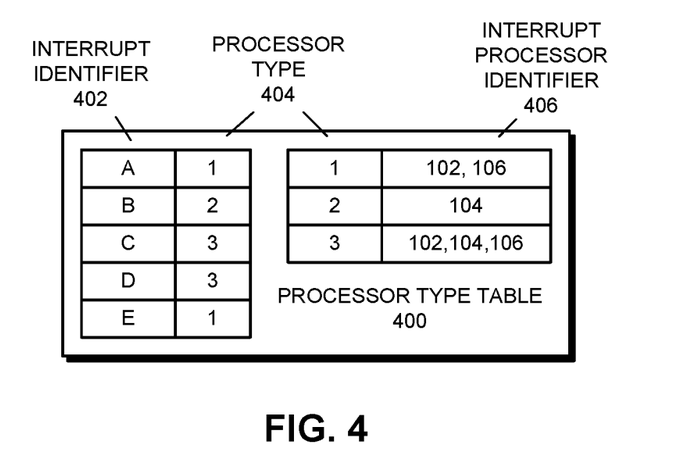
FIG. 4 presents a block diagram illustrating a processor type table in accordance with some embodiments.

In some embodiments, a table and/or another type of record is generated that includes a listing or mapping of interrupt-processor type associations. The table is configured to be used to determine the processor type for processing some or all of the interrupts. FIG. 4 presents a block diagram illustrating a processor type table 400 in accordance with some embodiments. As can be seen in FIG. 4, processor type table 400 includes an identification of three processor types 404 and an identification of the interrupt processors 406 included in each processor type 404 (as shown by the abbreviated element numbers "102" for processor 102, "104" for network processor 104, etc.). For example, processor type 404 "1" includes processor 102 and embedded processor 106 (a processor type may include any number of interrupt processors that have been correspondingly classified). Processor type table 400 also includes an identification of the processor type 404 to be used to process each of a set of identified interrupts 402. For example, processor type 404 "3" is to be used for processing interrupt "C."

Although processor type table 400 is presented as an example of a record of processor types, in some embodiments, a different arrangement of table or different record is used. Generally, the described embodiments can use any appropriate technique for keeping track of processor types. In addition, the letters and numbers used to identify interrupts and processors in FIG. 4 represent what would be actual identifiers for interrupts (e.g., numerical values, strings, bitmasks, etc.) and processors (e.g., numerical values, strings, bitmasks, addresses, processor identifiers, etc.) in some embodiments.

Acquiring In-Band Interrupt Identifiers

In some embodiments, an interrupt source that may signal in-band interrupts acquires corresponding interrupt identifiers. The interrupt identifiers include information that is subsequently used by the interrupt source to cause an allocated interrupt processor to process the in-band interrupts. More specifically, an interrupt source may initially be unaware of what interrupt processor is to be used to process a specified in-band interrupt. The in-band interrupt source therefore requests, from an interrupt controller (or another source, such as a processor, an operating system, etc.) in computing device 100, information that identifies the interrupt processor that is to process the specified in-band interrupt.

Figure 5:
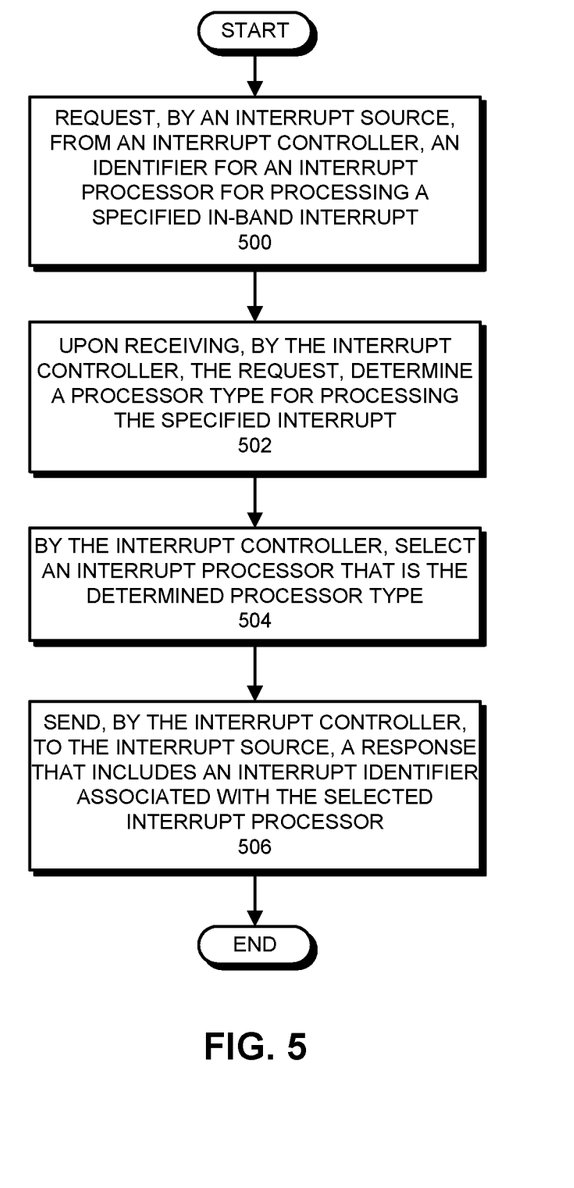
FIG. 5 presents a flowchart illustrating a process for acquiring an interrupt identifier in accordance with some embodiments.

FIG. 5 presents a flowchart illustrating a process for acquiring an interrupt identifier in accordance with some embodiments. Note that the operations shown in FIG. 5 are presented as a general example of operations performed by some embodiments. The operations performed by other embodiments include different operations and/or operations that are performed in a different order. Additionally, although certain mechanisms/elements are used in describing the operations (e.g., I/O interrupt controller 120, etc.), in some embodiments, other mechanisms perform the operations and/or the operations are performed on other mechanisms/elements. For example, in some embodiments, the request is not sent to I/O interrupt controller 120, but is instead sent to (and handled by) a processor, an operating system, and/or another hardware or software entity in computing device 100.

As shown in FIG. 5, the process starts when an interrupt source sends, to I/O interrupt controller 120, a request for an identifier for an interrupt processor for processing a specified interrupt (step 500). The specified interrupt is an in-band interrupt that the interrupt source (e.g., a peripheral device) may raise at some future point, and thus the request is requesting information identifying an interrupt processor for processing the interrupt in computing device 100. The request includes sufficient information to identify the interrupt, and may include other information, such as an indication that the interrupt source is requesting that a particular processor type be allocated to process the interrupts.

Upon receiving the request for the identification of the processor for processing the specified interrupt, I/O interrupt controller 120 determines a processor type for processing the specified interrupt (step 502). For example, I/O interrupt controller 120 may perform a lookup in a table such as processor type table 400 to determine, based on the identifier for the specified interrupt from the request, a processor type. In some embodiments, this determination is assisted by information from the request, i.e., the above-described request that a particular processor type be allocated to process the interrupts.

I/O interrupt controller 120 then selects an interrupt processor in computing device 100 that is the determined processor type (step 504). For example, I/O interrupt controller 120 may perform a lookup into the table to determine, based on the processor type, a specific interrupt processor in computing device 100 that is to be used for processing the in-band interrupts from the peripheral device. It is assumed for this example that such a processor exists; if not, a default processor or another processor type may be used.

In some embodiments, there are two or more interrupt processors of a determined processor type in computing device 100 such as processor type 404 "1" in FIG. 4, which includes processor 102 and embedded processor 106. In these embodiments, as part of step 504, I/O interrupt controller 120 selects, based on one or more criteria, one of the two or more processors that is the processor type as the specific interrupt processor for processing the specified in-band interrupt from the interrupt source. In some embodiments, the criteria include any criterion or combination thereof that can be used to distinguish interrupt processors from one another. For example, current/past/expected future workload, computational power, computational resources, battery level/power consumption, physical location in computing device 100, an operating system or software provided, etc. For instance, I/O interrupt controller 120 may determine a temperature or current workload of the each of the interrupt processors of a determined processor type and use the temperature or workload to choose a less-loaded or lower-temperature interrupt processor.

I/O interrupt controller 120 then generates or otherwise acquires an interrupt identifier for the selected interrupt processor. For example, I/O interrupt controller 120 may generate or otherwise acquire a representation of a memory-mapped memory address for a memory location (register, memory element, etc.) to which the in-band interrupt is to be written to cause the interrupt processor to process the interrupt.

I/O interrupt controller 120 then sends, to the interrupt source, a response that includes the interrupt identifier associated with the selected interrupt processor (step 506). For example, in some embodiments, I/O interrupt controller 120 sends an interrupt vector to the interrupt source. In these embodiments, the interrupt identifier includes information such as the memory-mapped memory address for a memory location (or a representation thereof) to be used by the interrupt source to cause the selected interrupt processor to process the specified interrupt.

In some embodiments, as part of sending the interrupt identifier to the interrupt source, I/O interrupt controller 120 allocates the selected interrupt processor for handling in-band interrupts from the interrupt source. This allocation may include additional operations for handling the allocation, such as recording/tracking the allocation, not reallocating the interrupt source or not reallocating the interrupt source more than a given number of times, informing the interrupt source of the allocation, etc.

Determining an Interrupt Processor for a Local Interrupt

Figure 6:
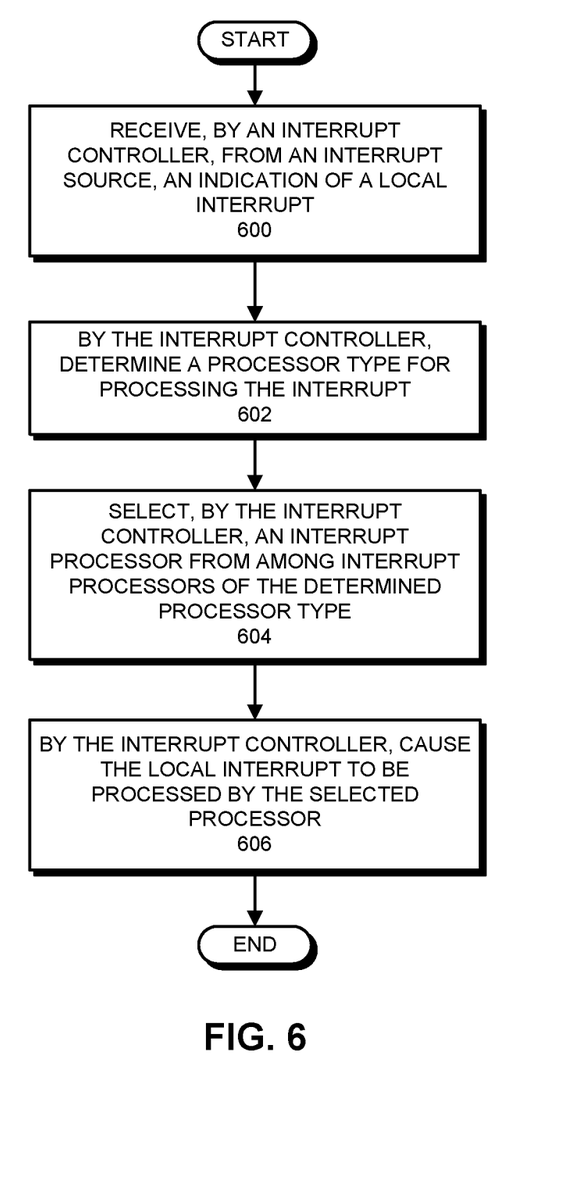
FIG. 6 presents a flowchart illustrating a process for processing a local interrupt in accordance with some embodiments.

FIG. 6 presents a flowchart illustrating a process for processing a local interrupt in accordance with some embodiments. Note that the operations shown in FIG. 6 are presented as a general example of operations performed by some embodiments. The operations performed by other embodiments include different operations and/or operations that are performed in a different order. Additionally, although certain mechanisms/elements are used in describing the operations (e.g., interrupt controller 114, etc.), in some embodiments, other mechanisms perform the operations and/or the operations are performed on other mechanisms/elements.

As shown in FIG. 6, the process starts when interrupt controller 114 in processor 102 receives, from an interrupt source, an indication of a local interrupt (step 600). Generally, local interrupts are interrupts that are signaled to interrupt controller 114 from within processor 102, from interrupt sources such as hardware functional blocks (e.g., a processing circuit, a cache, a memory management unit, etc.) or software entities executed by processor 102 (e.g., an operating system, a driver, an application program, etc.). The nature of the received indication of the local interrupt depends on how local interrupts are signaled by the interrupt source. For example, in some embodiments, the interrupt source signals local interrupts as out-of-band interrupts using dedicated signal lines. In these embodiments, receiving the indication means determining that a predetermined signal has been asserted on one or more dedicated signal lines.

As another example, in some embodiments, the interrupt source signals interrupts as in-band interrupts using a specified memory location (register, memory element, etc.). In these embodiments, receiving the indication means determining that a write has occurred to the specified memory location.

Interrupt controller 114 then determines a processor type for processing the local interrupt (step 602). This operation involves interrupt controller 114 determining, from among two or more processor types, each processor type including at least some of the available interrupt processors in computing device 100 (processor 102, network processor 104, embedded processor 106, etc.), which processor type is to be used for processing the local interrupt. In some embodiments, this operation includes performing a lookup in a table that includes a listing of interrupt-processor type associations (e.g., processor type table 400) to determine the processor type for processing the local interrupt. For example, in embodiments that use processor type table 400, assuming that interrupt controller 114 receives an indication of interrupt "C" from the interrupt source, interrupt controller 114 determines that processor type "3" is the processor type. During this operation, the lookup uses information from or based on the local interrupt when performing the lookup. For example, the local interrupt may include an interrupt identifier such as a number, a string, a bitmask, etc. that is used when performing the lookup.

In some embodiments, the above-described table is received by interrupt controller 114 from a source such as an operating system executed by processor 102, an external source (e.g., by system admin, system developer, etc. updating firmware, etc.), an application program, etc. In some embodiments, the table may be updated statically (as by updating firmware, etc.) or at runtime/dynamically (as computing device 100 is under control of an operating system following a boot-up sequence) to enable remapping/redirecting interrupts to particular processor types and/or adding or removing specified interrupt processors from the processor types. In this way, interrupt-processor type associations can be statically or dynamically set and reset at interrupt controller 114. In some embodiments, updating the table includes using security and control mechanisms (e.g., lock and release mechanisms, etc.) to prevent access to the table at an inappropriate time (as the table is being read, etc.) and by inappropriate entities (malicious software, etc.).

In some embodiments, the interrupt source is unaware of the processor type that is determined by interrupt controller 114. In these embodiments, the interrupt source may simply use a particular mechanism (e.g., dedicated signal lines, interrupt identifiers, etc.) to signal interrupt controller 114 that a processor is to process the interrupt, without a specific indication of the particular processor that is to eventually process the interrupt. In some of these embodiments, the interrupt source may not be aware that the processor type has changed (e.g., when the table is changed), and may continue to send interrupts to interrupt controller 114 for processing in the same way. In these embodiments, by using the table as described, interrupt processor types can be changed without individually informing the interrupt sources.

Interrupt controller 114 then selects an interrupt processor from among the interrupt processors of the determined processor type for processing the interrupt (step 604). Continuing the above example for embodiments that use processor type table 400, assuming that interrupt controller 114 has determined that processor type "3" is the processor type, interrupt controller 114 may then select a processor of processor type 3 (which includes processor 102, network processor 104, and embedded processor 106) to process the interrupt. When selecting one of multiple interrupt processors of the determined processor type, interrupt controller 114 may base the selection on one or more criteria, such as workload, temperature, processor characteristics, interrupt type, a round robin pattern, etc.

Interrupt controller 114 next causes the interrupt to be processed by the selected interrupt processors (step 606). In some embodiments, "causing" the interrupt to be processed by the selected interrupt processor in step 604 includes signaling the interrupt to the selected interrupt processor in order to cause the selected interrupt processor to process the interrupt. For example, interrupt controller 114 may signal an out-of-band interrupt to the selected processor using dedicated signal lines or may signal an in-band interrupt by writing a corresponding value to a specified memory location (register, memory element, etc.) for the selected processor.

In some embodiments, if processor 102, in which interrupt controller 114 is located, is the processor type, interrupt controller 114 may select processor 102 and cause processor 102 to process the interrupt. In some embodiments, interrupt controller 114 preferentially selects processor 102 over other interrupt processors of the determined processor type. Otherwise, interrupt controller 114 may forward the interrupt to a different/remote interrupt processor (e.g., one of network processor 104, embedded processor 106, etc.) for processing.

In some embodiments, interrupt controller 114 may determine a processor type as described in step 602, but further determine that the processor type is to be overridden. In some embodiments, the overriding of the determined processor type is based on one or more criterion. In some embodiments, the criteria include any criterion or combination thereof. For example, current/past/expected future workload, computational power, computational resources, battery level/power consumption, physical location in computing device 100, an operating system or software provided, prior interrupt processing information, etc. More generally, in some embodiments, it is not required to use a determined processor type for processing interrupts. In these embodiments, the determined processor type may be considered merely a "hint" or a "suggestion" for processing interrupts.

Determining an Interrupt Processor for an External Interrupt

Figure 7:
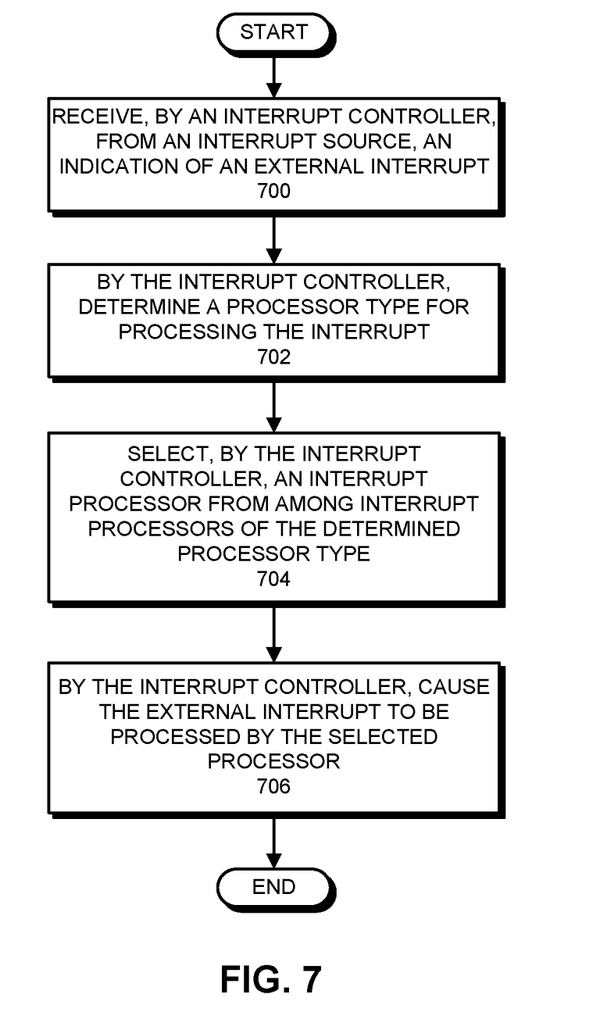
FIG. 7 presents a flowchart illustrating a process for processing an external interrupt in accordance with some embodiments.

FIG. 7 presents a flowchart illustrating a process for processing en external interrupt in accordance with some embodiments. Note that the operations shown in FIG. 7 are presented as a general example of operations performed by some embodiments. The operations performed by other embodiments include different operations and/or operations that are performed in a different order. Additionally, although certain mechanisms/elements are used in describing the operations (e.g., interrupt controller 114, etc.), in some embodiments, other mechanisms perform the operations and/or the operations are performed on other mechanisms/elements.

As shown in FIG. 7, the process starts when interrupt controller 114 in processor 102 receives, from an interrupt source, an indication of an external interrupt (step 700). Generally, external interrupts are interrupts that are signaled to interrupt controller 114 from outside processor 102, from interrupt sources such as peripheral devices and/or I/O interrupt controller 120, other processors, etc. via interrupt messages 122. The nature of the received indication of the external interrupt depends on how interrupts are signaled by the interrupt source. For example, in some embodiments, the interrupt source signals external interrupts as out-of-band interrupts using dedicated signal lines. In these embodiments, receiving the indication means determining that a predetermined signal has been asserted on one or more dedicated signal lines of bus 110. As another example, in some embodiments, the interrupt source signals interrupts as in-band interrupts using a specified memory location (register, memory element, etc.). In these embodiments, receiving the indication means determining that a write has occurred to the specified memory location.

Interrupt controller 114 then determines a processor type for processing the external interrupt (step 702). As described above, this operation involves interrupt controller 114 determining, from among two or more processor types, each processor type including at least some of the available interrupt processors in computing device 100 (processor 102, network processor 104, embedded processor 106, etc.), which processor type is to be used for processing the external interrupt. In some embodiments, this operation includes performing a lookup in a table that includes a listing of interrupt-processor type associations (e.g., processor type table 400) to determine the processor type for processing the external interrupt. During this operation, the lookup uses information from or based on the external interrupt when performing the lookup. For example, the external interrupt may include an interrupt identifier such as a number, a string, a bitmask, etc. that is used when performing the lookup. In embodiments that use processor type table 400, assuming that interrupt controller 114 receives an indication of interrupt "C" from the interrupt source, interrupt controller 114 determines that processor type "3" is the processor type. During this operation, the lookup uses information from or based on the external interrupt when performing the lookup. For example, the external interrupt may include an interrupt identifier such as a number, a string, a bitmask, etc. that is used when performing the lookup.

In some embodiments, the above-described table is received by interrupt controller 114 from a source such as an operating system executed by processor 102, an external source (e.g., by system admin, system developer, etc. updating firmware, etc.), an application program, etc. In some embodiments, the table may be updated statically (as by updating firmware, etc.) or at runtime/dynamically (as computing device 100 is under control of an operating system following a boot-up sequence) to enable remapping/redirecting interrupts to particular processor types and/or adding or removing specified interrupt processors from the processor types. In this way, interrupt-processor type associations can be statically or dynamically set and reset at interrupt controller 114. In some embodiments, updating the table includes using security and control mechanisms (e.g., lock and release mechanisms, etc.) to prevent access to the table at an inappropriate time (as the table is being read, etc.) and by inappropriate entities (malicious software, etc.).

In some embodiments, the interrupt source is unaware of the processor type that is determined by interrupt controller 114. In these embodiments, the interrupt source may simply use a particular mechanisms (e.g., dedicated signal lines, interrupt identifiers, etc.) to signal interrupt controller 114 that a processor is to process the interrupt, without a specific indication of the particular processor that is to eventually process the interrupt. In some of these embodiments, the interrupt source may not be aware that the processor type has changed (e.g., when the table is changed), and may continue to send interrupts to interrupt controller 114 for processing in the same way. In these embodiments, by using the table as described, interrupt processor types can be changed without individually informing the interrupt sources.

Interrupt controller 114 then selects an interrupt processor from among the interrupt processors of the determined processor type for processing the interrupt (step 704). Continuing the above example for embodiments that use processor type table 400, assuming that interrupt controller 114 has determined that processor type "3" is the processor type, interrupt controller 114 may then select a processor of processor type 3 (which includes processor 102, network processor 104, and embedded processor 106) to process the interrupt. When selecting one of multiple interrupt processors of the determined processor type, interrupt controller 114 may base the selection on one or more criteria, such as workload, temperature, processor characteristics, interrupt type, a round robin pattern, etc.

Interrupt controller 114 next causes the interrupt to be processed by the selected interrupt processors (step 706). In some embodiments, "causing" the interrupt to be processed by the selected interrupt processor in step 706 includes signaling the interrupt to the selected interrupt processor in order to cause the selected interrupt processor to process the interrupt. For example, interrupt controller 114 may signal an out-of-band interrupt to the selected processor using dedicated signal lines or may signal an in-band interrupt by writing a corresponding value to a specified memory location (register, memory element, etc.) for the selected processor.

In some embodiments, if processor 102, in which interrupt controller 114 is located, is the processor type, interrupt controller 114 may select processor 102 and cause processor 102 to process the interrupt. In some embodiments, interrupt controller 114 preferentially selects processor 102 over other interrupt processors of the determined type. Otherwise, interrupt controller 114 may forward the interrupt to a different/remote interrupt processor (e.g., one of network processor 104, embedded processor 106, etc.) for processing.

In some embodiments, interrupt controller 114 may determine a processor type as described in step 702, but further determine that the processor type is to be overridden. In some embodiments, the overriding of the determined processor type is based on one or more criterion. In some embodiments, the criteria include any criterion or combination thereof. For example, current/past/expected future workload, computational power, computational resources, battery level/power consumption, physical location in computing device 100, an operating system or software provided, prior interrupt processing information, etc. More generally, in some embodiments, it is not required to use a determined processor type for processing interrupts. In these embodiments, the determined processor type may be considered merely a "hint" or a "suggestion" for processing interrupts.

In some embodiments, a computing device (e.g., computing device 100) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A non-transitory computer-readable storage medium can be any device or medium or combination thereof that stores code and/or data for use by a computing device. For example, the non-transitory computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, "computer-readable storage mediums" are not intended to include non-statutory computer-readable storage mediums such as transitory signals.

In some embodiments, one or more hardware modules (e.g., processor 102, embedded processor 106, I/O interrupt controller 120, etc.) are configured to perform the operations herein described. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks are referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for processing interrupts in a computing device comprising a plurality of processors, the plurality of processors comprising a central processing unit and a graphics processing unit, wherein each processor of the plurality of processors is at least one of two or more processor types, the method comprising:
   by an interrupt controller in the computing device:
      receiving an indication of an interrupt;
      determining a processor type for processing the interrupt, the determining comprising selecting the processor type from among the two or more processor types, wherein at least one of the two or more processor types is associated with at least two different heterogeneous processors from among the plurality of processors in the computing device that each have at least one of different features or functionality, each of the at least two different heterogeneous processors being similarly suitable for processing corresponding interrupts despite each having the at least one of the different features or functionality; and
      causing the interrupt to be processed by one of the plurality of processors that is the determined processor type.

2. The method of claim 1, further comprising:
   receiving a table that comprises an identification of a corresponding processor type that is to be used for processing each interrupt in a set of interrupts;
   wherein determining the processor type comprises determining the processor type based on the table.

3. The method of claim 2, wherein the method further comprises:
   acquiring one or more updates of the table during system operation subsequent to a boot-up operation.

4. The method of claim 2, wherein the identification of the corresponding processor type that is to be used for processing each interrupt is based on at least one of:
   capabilities of each interrupt processor;
   interrupt types;
   one or more resources associated with each interrupt processor;
   a logical partitioning of the plurality of processors;
   workloads for processors of the plurality of processors; and
   security attributes for processors of the plurality of processors.

5. The method of claim 1, further comprising:
   overriding the determined processor type for processing the interrupt based on one or more criteria, the overriding comprising causing the interrupt to be processed by one of the plurality of processors that is a different processor type than the determined processor type.

6. The method of claim 1, wherein causing the interrupt to be processed by one of the plurality of processors comprises:
   forwarding the interrupt to a processor of the plurality of processors that is the determined processor type for processing.

7. The method of claim 1, wherein two or more processors of the plurality of processors are the determined processor type, and wherein the method further comprises:
   selecting, based on one or more criteria, the processor of the plurality of processors from among the two or more processors of the plurality of processors that are the determined processor type.

8. The method of claim 1, wherein receiving the indication of the interrupt comprises receiving, for an out-of-band interrupt, a signal indicating the interrupt on a corresponding signal line or detecting, for an in-band interrupt, a write of a corresponding memory location.

9. The method of claim 1, wherein each processor type comprises one or more processors of the plurality of processors having similar characteristics that enable the one or more processors to process corresponding interrupts more efficiently than other processor types.

10. A method for processing interrupts in a computing device comprising a plurality of processors, the plurality of processors comprising a central processing unit and a graphics processing unit, wherein each processor of the plurality of processors is at least one of two or more processor types, the method comprising:
    by the computing device:
       receiving, from an interrupt source, a request for an identification for a processor for processing a specified interrupt;
       determining a processor type for processing the interrupt, the determining comprising selecting the processor type from among the two or more processor types, wherein at least one of the two or more processor types is associated with at least two different heterogeneous processors from among the plurality of processors in the computing device that each have at least one of different features or functionality, each of the at least two different heterogeneous processors being similarly suitable for processing corresponding interrupts despite each having the at least one of the different features or functionality;
       selecting one of the plurality of processors that is the determined processor type; and
       sending, to the interrupt source, an interrupt identifier associated with the one of the plurality of processors, the interrupt identifier including information to be used by the interrupt source to cause the one of the plurality of processors to process the specified interrupt.

11. The method of claim 10, wherein two or more processors of the plurality of processors are the determined processor type, and wherein selecting the one of the plurality of processors that is the determined processor type comprises:
selecting, based on one or more criteria, the one of the plurality of processors that is the determined processor type from among the two or more processors of the plurality of processors.

12. The method of claim 10, wherein the information to be used by the interrupt source to cause the one of the plurality of processors to process the specified interrupt comprises:
an identifier of a memory location that is to be written with information about interrupts to cause the one of the plurality of processors to process the interrupts.

13. The method of claim 10, further comprising:
sending, to the interrupt source, an updated interrupt identifier, the updated interrupt identifier associated with a different one of the plurality of processors that is the determined processor type, and the updated interrupt identifier including information to be used by the interrupt source to cause the different one of the plurality of processors to process the specified interrupt.

14. The method of claim 10, wherein receiving the request for the identification of the processor comprises receiving:
an indication that a particular processor type is to be allocated for processing the interrupt.

15. A computing device that processes interrupts, comprising:
a plurality of processors, the plurality of processors comprising a central processing unit and a graphics processing unit, wherein each processor of the plurality of processors is at least one of two or more processor types; and
an interrupt controller configured to:
receive an indication of an interrupt;
determine a processor type for processing the interrupt, the determining comprising selecting the processor type from among the two or more processor types, wherein at least one of the two or more processor types is associated with at least two different heterogeneous processors from among the plurality of processors in the computing device that each have at least one of different features or functionality, each of the at least two different heterogeneous processors being similarly suitable for processing corresponding interrupts despite each having the at least one of the different features or functionality; and
cause the interrupt to be processed by one of the plurality of processors that is the determined processor type.

16. The computing device of claim 15, wherein the interrupt controller is further configured to:
receive a table that comprises an identification of a corresponding processor type that is to be used for processing each interrupt in a set of interrupts;
wherein determining the processor type comprises determining the processor type based on the table.

17. The computing device of claim 16, wherein the interrupt controller is further configured to:
acquire one or more updates of the table during system operation subsequent to a boot-up operation.

18. The computing device of claim 15, wherein the interrupt controller is further configured to:
override the determined processor type for processing the interrupt based on one or more criteria, the overriding comprising causing the interrupt to be processed by one of the plurality of processors that is a different processor type than the determined processor type.

19. The computing device of claim 15, wherein, when causing the interrupt to be processed by the one of the plurality of processors, the interrupt controller is configured to:
when the processor in which the interrupt controller is located is not the determined processor type or when the interrupt controller is not located in a processor, forward the interrupt to a processor of the plurality of processors that is the determined processor type for processing.

20. The computing device of claim 15, wherein two or more processors of the plurality of processors are the determined processor type, and wherein the interrupt controller is further configured to:
select, based on one or more criteria, the processor of the plurality of processors from among the two or more processors of the plurality of processors that are the determined processor type.

* * * * *